May 1, 1962 A. SCHOEPE ET AL 3,032,229
COMPOSITE HOUSING
Filed April 6, 1959 2 Sheets-Sheet 1
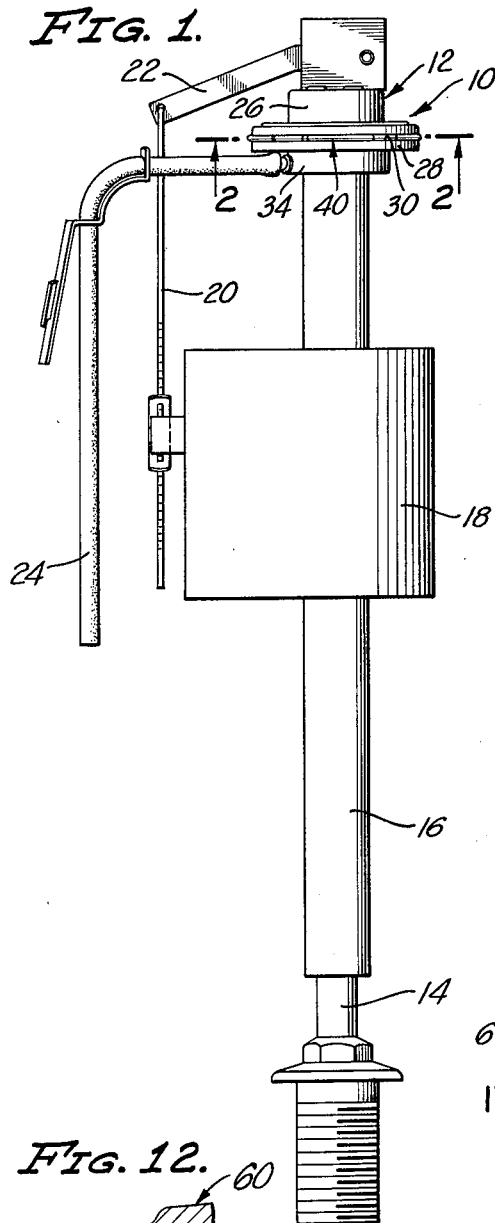
INVENTORS
ADOLF SCHOEPE,
ORVILLE K. DOYLE
BY Thomas Mahoney
ATTORNEY

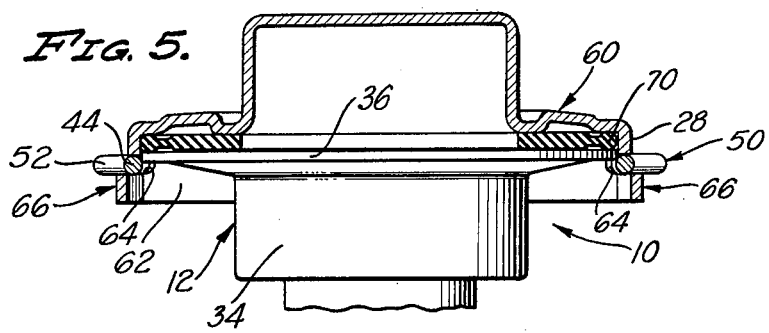
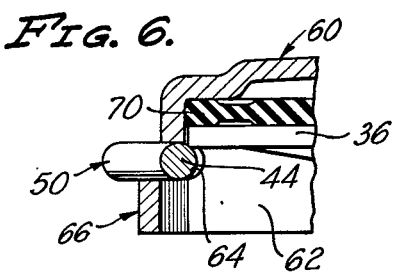
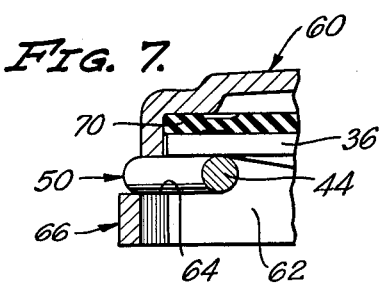
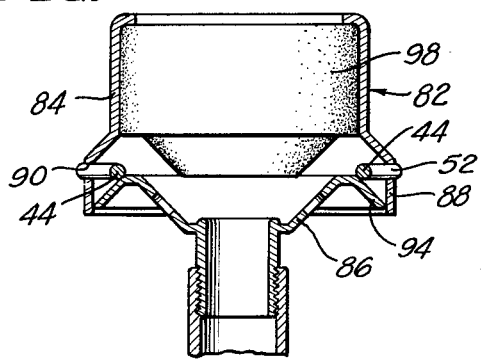
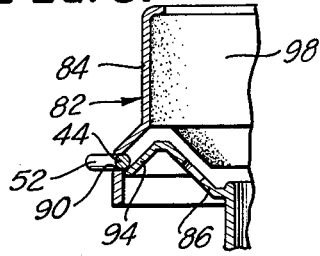
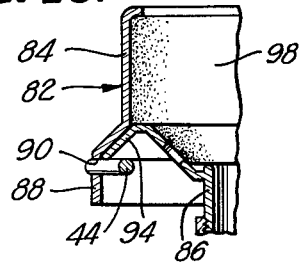
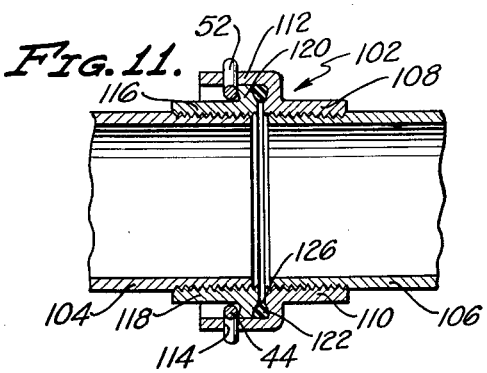

United States Patent Office 3,032,229
Patented May 1, 1962

3,032,229
COMPOSITE HOUSING
Adolf Schoepe, 1620 N. Raymond Ave., and Orville K. Doyle, 11961 E. Las Palmas Drive, both of Fullerton, Calif.
Filed Apr. 6, 1959, Ser. No. 804,263
3 Claims. (Cl. 220—4)

This invention relates to a composite housing construction wherein the housing is particularly adapted for use in conjunction with valve assemblies, and wherein the component parts of the composite housing construction may be readily disassembled and reassembled to facilitate the installation or removal of various components of the valve assembly within or from said housing.

In order to illustrate the construction and mode of utilization of the composite housing of our invention it is illustrated as embodied in a ball cock adapted to be mounted within the flush tank of a conventional toilet but it is, of course, not intended that the teachings of the invention be limited to the particular application discussed hereinbelow because it is obvious to those skilled in the art that said teachings can be applied with equal cogency to various types of construction.

Furthermore, the teachings of the invention are applicable not only to various types of composite housings, but to various applications where first and second coupling members must be maintained securely but separably in operative engagement with each other and, if desired, in fluid-tight engagement. A typical embodiment of such an application of the invention is disclosed in a pipe coupling hereinbelow.

One of the problems encountered in conventional valve housings is the difficulty involved in disassembling the component parts of such housings in order that access may be had to the valve member to replace the same and the corersponding difficulty encountered upon attemped reassembly of said component parts of said housing.

It is, therefore, an object of our invention to provide a composite valve housing which is characterized by the relative ease with which the component parts thereof may be disassembled to permit access to be had to the valve members or elements located within the housing, and the corresponding facility with which the component parts of the housing may be reassembled after the replacement of a worn or broken part within the housing. If desired, the component parts can be disassembled to permit removal of obstructing material or for adjustment.

Another object of our invention is the provision of a composite housing of the above mentioned character which includes first and second housing members, said first and second housing members being adapted to be disposed in internested relationship with each other and having a spring fastener associated therewith to maintain said first and second housing members in operative engagement. Therefore, when it is desired to disassemble the first and second housing members from operative engagement with each other, it is merely necessary to disengage the spring fastener to release the first and second housing members from each other, thus permitting access to be had to the valve member disposed within said housing.

Another object of our invention is the provision of a composite housing of the aforementioned character which includes a first housing member of substantially circular, or cylindrical configuration, said first housing member having a depending or axially oriented skirt and said skirt incorporating a plurality of spaced openings or slots in the perimeter thereof, the second housing member incorporating a radially extending flange adapted to be inserted within the aforementioned skirt and the fastener being constituted by a split, spring ring having a plurality of spaced, inwardly directed protrusions thereupon adapted to engage in said openings and underlie the radially directed flange to maintain the second housing member in operative engagement with the first housing member.

Another object of our invention is the provision of a composite housing of the aforementioned character in which the aforesaid split, spring ring is of generally cruciform configuration and incorporates a plurality of spaced, inwardly directed protrusions adapted to engage in the spaced openings in the skirt of the first housing member. An associated object of the invention is the provision of a fastener of the aforementioned character wherein there is provided upon one extremity thereof an outwardly directed portion adapted to be engaged during the insertion or removal of the fastener to facilitate said insertion or removal.

With the composite housing of our invention is incorporated in a ball cock construction wherein the housing is located within the relatively limited confines of a flush tank, the ease with which the spring fastener ring may be installed upon or removed from operative engagement with the first and second housing members of the composite housing materially reduces the difficulty of replacing various valve components within the housing. To facilitate such installation or removal of valve components and to further facilitate the operative engagement of the spring fastener ring with the composite housing, we provide locating means constituted by a plurality of radial protuberances formed in the skirt adjacent the aforementioned openings or slots whereby the spring ring will engage said locating means and thus be automatically oriented in the proper relationship with said openings or slots.

Another object of our invention is the provision of a composite construction including first and second coupling members which are telescopically engageable with each other and which are adapted to be maintained in operative engagement by means of an easily installed and removed spring, snap ring insertable in cooperative relationship with said members.

Other objects and advantages of our invention will be apparent from the following specification and the accompanying drawings, which are for the purpose of illustration only, and in which:

FIG. 1 is a side elevational view of a ball cock constructed in accordance with the teachings of our invention;

FIG. 2 is a transverse, sectional view taken on the broken line 2—2 of FIG. 1;

FIG. 3 is a perspective view of an alternative form of the snap ring of our invention;

FIG. 4 is a transverse, sectional view taken in the same direction as FIG. 2 and showing an alternate construction of the first housing member of the invention;

FIG. 5 is a transverse, sectional view taken on the broken line 5—5 of FIG. 4 before installation of the snap ring;

FIG. 6 is an enlarged fragmentary, sectional view illustrating the installation of a snap ring of the invention in operative engagement with the composite housing;

FIG. 7 is a view similar to FIG. 6 showing another state of the installation;

FIG. 8 illustrates an alternative embodiment of the invention;

FIG. 9 is an enlarged, fragmentary, sectional view showing the assembly of the component parts of the embodiment of FIG. 8;

FIG. 10 is a view similar to FIG. 9 showing the final assembly of said component parts;

FIG. 11 is a longitudinal, sectional view showing the teachings of the invention as applied to a pipe coupling; and FIG. 12 is an enlarged, fragmentary, sectional view illustrating the imposition of a shear load on the snap ring of the invention taken on the broken line 12—12 of FIG. 4.

Referring to the drawings and particularly to FIG. 1 thereof, we show a ball cock 10 incorporating a composite housing 12 constructed in accordance with the teachings of our invention, the composite housing 12 being adapted to enclose a valve member, not shown, which controls the flow of fluid from an inlet pipe 14 to an outlet pipe 16. A float 18 is connected by a link 20 to a lever arm 22 which controls the operation of the valve components, not shown, located within the composite housing 12. A refill pipe 24 is also connected to the composite housing 12.

As can be readily visualized, when the ball cock 10 is installed within the relatively close confines of a flush tank, replacement of the valve components within the composite housing 12 entails the disassembly of the component parts of said composite housing, and to facilitate such disassembly, we provide a first housing member 26, said first housing member being of substantially circular or cylindrical configuration and having a depending, axially oriented skirt 28 which incorporates a plurality of semi-circular slots or openings 30 which are located intermediate the upper and lower extremities of said skirt.

The skirt 28 thus defines a chamber or receptacle 32 of generally circular configuration and said chamber is adapted for the reception of the second housing member 34. The second housing member 34 is of substantially circular or cylindrical configuration and includes a radial flange 36 whose diameter is slightly less than the minimum diameter of the receptacle 32 in the first housing member 26, thus permitting the radial flange to be inserted upwardly into the receptacle 32. In the particular embodiment of the invention under consideration here, the radial flange 36 incorporates a plurality of openings or apertures 38 which are adapted to serve as anti-siphon apertures for the ball cock 10.

The thickness or gage of the material from which the radial flange 36 of the second housing member 34 is formed is less than the depth of the skirt 28 on the first housing member 26 above the upper edges of the openings or slots 30 so that, when the second housing member 34 is disposed within the receptacle 32 defined by said skirt, the lower surface of the radial flange 36 is substantially coplanar with the upper edges of the openings 30.

While the first and second housing members 26 and 34, respectively, have been described as being of substantially circular or cylindrical configuration, it will be obvious that the configuration of these members can be varied and that, for instance, first and second housing members of hexagonal or other configurations could be provided which would function with equal effectiveness.

Mounted in operative engagement with the composite housing 12 is a fastener 40, said fastener being constituted by a split, spring ring 42 formed from spring wire, or the like, and incorporating alternate inwardly directed protrusions 44 and outwardly directed protrusions 46. The inwardly directed protrusions 44 are of the same number as and are adapted to be registered with the corresponding slots or openings 30 in the skirt 28 of the first housing member 26 and the alternate protrusions 44 and 46 impart a generally cruciform configuration to the spring ring 42, as best shown in FIG. 2 of the drawings.

An alternative embodiment of the fastener of our invention is shown at 50 in FIG. 4 of the drawings and is substantially identical with the previously discussed fastener 40 with the exception that the split, spring ring 52 constituting the same incorporates a radially and outwardly bending grip portion 54 upon one extremity thereof. Therefore, when the fastener 50 is installed in operative engagement with the components of the composite housing 12 in the manner described immediately hereinabove, the radially protruding grip portion 54 will facilitate the grasping and locating of the split, spring ring 52 constituting the fastener 50.

Since composite housings 12 of the invention are located in a confined space such as the flush tank, not shown, in which the ball cock 10 is located, it is occasionally difficult to properly register the fasteners 40 or 50 with the openings 30 in the skirt 28. Therefore, in an alternative embodiment of the first housing member shown at 60 in FIGS. 4–7 of the drawings the skirt 62 thereof incorporates a plurality of slots or openings 64 and an integral locating means 66 is provided adjacent each opening and constituted by an outstruck protuberance or land 68. Therefore, as best shown in FIG. 5 of the drawings, the locating means 66 will serve as a temporary support and registering means for the associated fastener 40 or 50 to insure that an installation can be made without the possibility of misregistration of the fastener with the associated openings 64 in the skirt 62.

The manner in which the snap ring 52 functions during its installation in cooperative relationship with the first and second housing members 60 and 34, respectively, is illustrated in FIGS. 5–7 of the drawings. In the particular embodiment of the invention shown in FIGS. 5–7 a resilient compression member 70 of generally O-ring configuration is installed upon the flange 36 of the second housing member 34 and the first housing member 60 is then deposited with its skirt in overlying relationship with the flange 36, as best shown in FIG. 5 of the drawings.

The snap ring 52 is then deposited in overlying relationship with the skirt 62 and the inwardly directed protuberances 44 thereupon are urged downwardly until they engage upon the integral locating means 66 constituted by the outstruck protuberances or lands 68. It will be noted that the provision of the locating means 66 automatically limits downward movement of the snap ring 52 and automatically locates the snap ring 52 in the plane in which the slots 64 in the skirt 62 are located.

However, it will be noted that when the inwardly directed protuberances 44 on the snap ring 52 are urged into the openings or slots 64 the lower edge of the flange 36 upon the second housing member 34 is disposed a short distance above the centerline of the flange 36. The location of the flange 36 in this position is attributable to the resilient compression member 70. As the inwardly directed protuberances 44 move inwardly the cylindrical cross sections thereof present camming surfaces to the associated edge of the flange 36 of the second housing member 34 and, as best illustrated in FIG. 6 of the drawings, the flange 36 is urged upwardly to progressively compress the compression member 70 which, incidentally, serves as a seal between the first and second housing members 60 and 34 respectively.

When the inwardly directed protrusions 44 are fully seated in the slots 64, as best shown in FIG. 7 of the drawings, the compression member 70 is fully compressed and the first and second housing members 60 and 34, respectively, are secured to each other against inadvertent separation despite subjection of the housing 12 to high fluid pressures of the order of 1,000 p.s.i. in applications where nominal pressures are normally encountered.

In the fragmentary section of FIG. 12 there is graphically illustrated the shear relationship between the flange 36 of the second housing member 34 and the inwardly directed protuberances 44 on the snap ring 52. The lower arrow 76 indicates the bearing of the respective inwardly directed protuberances 44 on the lower edge of the associated slot or opening 64 and the arrow 78 indicates a shear load imposed upon the snap ring 52 by high pressures impressed upon the flange 36 of the second housing member 34. Because of the minimal moment arm existing between the edge of the flange 36 and the bearing 76 for the snap ring 52 a relatively large force would be necessary to shear the inwardly directed protuberance 44 from the snap ring 52.

Of course, disassembly of the component parts of the housing 12 is greatly facilitated by the provision of the grip portion 54 upon the snap ring 52 since this grip portion permits the snap ring 52 to be grasped from above and the inwardly directed protuberances 44 to be progressively dislodged from engagement with the respective slots 64. As the inwardly directed protuberances 44 are pulled outwardly from engagement with the respective slots 64 the compression member 70 expands and the corresponding downward movement of the flange 36 causes the edge of the flange 36 to ultimately engage the inwardly directed protuberances 44 to facilitate the dislocation thereof from operative engagement with the slots 64.

The various embodiments of the composite housing 12 discussed immediately hereinabove are characterized by the ease with which the component parts of the housing can be assembled and disassembled. Furthermore, the construction of the snap rings 42 and 52 facilitates the assembly and disassembly of said component parts and insures the operative engagement of the component parts of the housing despite the subjection of said component parts to relatively high pressures.

An alternative embodiment of the invention is shown at 82 in FIGS. 8-10 of the drawings and constitutes a composite housing consisting of a first housing member 84 and a second housing member 86. The first housing member 84 incorporates a depending skirt 88 having a plurality of slots or openings 90 therein adapted for the reception of the inwardly directed protuberances 44 on a snap ring 52 of the character previously described. The second housing member incorporates an angularly and downwardly directed skirt or flange 94 which is adapted to be inserted within the skirt 88 in the manner shown in FIG. 8 of the drawings during the installation of the first and second housing members 84 and 86 in operative engagement with each other.

A rubber seal member 98 constituting no part of the present invention is disposed within the first housing member 84 and the snap ring 52 is installed with the inwardly directed protuberances 44 thereupon located in the slots 90 in the skirt 88 prior to assembly of the first housing member 84 with the second housing member 86. The initial step of assembly involves the insertion of the flange 94 of the second housing member 86 within the skirt 88 of the first housing member 84 and as the first housing member 84 is moved downwardly the inwardly projecting protuberances 44 are cammed outwardly by the action of the angular skirt 94, as best shown in FIG. 10 of the drawings, until the lower edge of the flange 94 orients over the inwardly directed protuberances 44 and the protuberances snap inwardly to maintain the first and second housing members 84 and 86 in operative engagement with each other.

It will be noted that the embodiment of the invention shown in FIGS. 8-10 does not incorporate a resilient compression member of the character of the resilient compression member 70 previously discussed. However, when subjected to high pressures the snap ring 52 serves to resist the separation of the housing members 84 and 86 and to facilitate the easy assembly and disassembly of said first and second housing members.

While we have shown and described the invention as embodied in composite housings adapted to be utilized in various types of valves, it is obvious that the principles of the invention may be applied with equal cogency to various types of separable elements and there is illustrated in FIG. 11 of the drawings a pipe coupling 102 adapted to join abutting pipes 104 and 106 in fluid-engagement. The pipe coupling 102 includes a first coupling member 108 having a substantially cylindrical, internally threaded, pipe engaging boss 110 and an axially extending skirt 112 incorporating a plurality of slots or openings 114. A second member 116 includes an axially extending, internally threaded boss 118 and a substantially radial flange 120 insertable in the skirt 112. A resilient compression member 122 is disposable between abutting surfaces of the flange 120 and the first member 108 of the coupling.

To secure the pipe sections 104 and 106 in fluid tight engagement it is merely necessary to insert the extremities thereof in the internally threaded bosses 118 and 110, respectively, and to place the compression member 122 within the skirt 112 of the first member 108. After this has been accomplished the snap ring 52 may be mounted with the inwardly directed protuberances 44 thereupon projecting through the slots 114 in the skirt 112. The flange 120 is then pushed within the skirt 112 and pushed axially against the protuberances 44 which will retract because of the angular surface 126 on said flange and the flange 120 can then be urged therepast against the compression member 122 until it compresses the compression member 122 and the inwardly directed protuberances snap inwardly behind the flange 120 to secure the first and second members 108 and 116 in operative engagement with each other.

In disassembling the members 108 and 116 it is merely necessary to remove the snap ring 52 from operative engagement with the slots or openings 114 in the skirt 112 in the same manner as described in considering the previously discussed embodiments of the invention.

We have thus provided by our invention a widely applicable form of separable connection whereby two housing or coupling elements can be separably but effectively maintained in operative engagement with each other through the relatively simple expedient of a snap ring cooperating therewith.

We claim:

1. In a composite, separable housing construction, the combination of: a first housing member incorporating a centrally located, substantially cylindrical chamber, a radial flange formed integrally with said chamber and an axially extending skirt on the perimeter of said flange, said skirt having a plurality of narrow, elongated, circumferentially extending, radial slots therein extending through the wall thereof intermediate its length; a second housing member incorporating a radial disk portion having a plurality of openings therein and a centrally located boss formed integrally with said disk portion and having an inlet opening therein communicating with said chamber in said first housing member, said radial disk portion having a substantially flat undersurface at its perimeter which is disposable within said skirt above said slots; and a fastener disposed in encompassing relationship with said skirt and having a plurality of inwardly directed radial protrusions thereupon inserted in said slots and into underlying relationship with said substantially flat undersurface of said disk portion to maintain said first and second housing members in operative relationship with each other, said fastener being constituted by a substantially cruciform split ring and one extremity of said split ring incorporating a radially directed protrusion thereupon whereby said fastener may be engaged during the removal or insertion thereof.

2. In a composite, separable housing construction, the combination of: a first housing member incorporating a centrally located, substantially cylindrical chamber, a radial flange formed integrally with said chamber and an axially extending skirt on the perimeter of said flange, said skirt having a plurality of narrow, elongated, circumferentially extending, radial slots therein extending through the wall thereof intermediate its length; a second housing member incorporating a radial disk portion having a plurality of openings therein and a centrally located boss formed integrally with said disk portion and having an inlet opening therein communicating with said chamber in said first housing member, said radial disk portion having a substantially flat undersurface at its perimeter which is disposable within said skirt above said slots; a deformable sealing member interposed between said radial flange of said first housing member and the upper surface of said disk portion of said second housing member; and a fastener disposed in encompassing relationship with said skirt and having a plurality of inwardly directed radial protrusions thereupon inserted in said slots and into underlying relationship with said substantially flat undersurface of said disk portion to maintain said first and second housing members in operative relationship with each other, said fastener being constituted by a substantially cruciform split ring.

3. In a composite, separable housing construction, the combination of: a first housing member incorporating a centrally located, substantially cylindrical chamber, a radial flange formed integrally with said chamber and an axially extending skirt on the perimeter of said flange, said skirt having a plurality of narrow, elongated, circumferentially extending, radial slots therein extending through the wall thereof intermediate its length; a second housing member incorporating a radial disk portion having a plurality of outlet openings therein and a centrally located boss formed integrally with said disk portion and having an inlet opening therein communicating with said chamber in said first housing member, said radial disk portion having a substantially flat undersurface at its perimeter which is disposable within said skirt above said slots, said outlet openings permitting discharge of fluid therethrough when said inlet opening is in communication with said outlet openings; and a fastener disposed in encompassing relationship with said skirt and having a plurality of inwardly directed radial protrusions thereupon inserted in said slots and into underlying relationship with said substantially flat undersurface of said disk portion to maintain said first and second housing members in operative relationship with each other, said fastener being constituted by a substantially cruciform split ring and one extremity of said split ring incorporating a radially directed protrusion thereupon whereby said fastener may be engaged during the removal or insertion thereof.

References Cited in the file of this patent

UNITED STATES PATENTS

| | | |
|---|---|---|
| 649,800 | Bollard | May 15, 1900 |
| 1,416,232 | Osborn | May 16, 1922 |
| 1,958,165 | Le Compte | May 8, 1934 |
| 2,021,241 | Mall | Nov. 19, 1935 |
| 2,260,712 | Harrison | Oct. 28, 1941 |
| 2,812,093 | Podesta | Nov. 5, 1957 |
| 2,865,076 | Newton et al. | Dec. 23, 1958 |

FOREIGN PATENTS

| | | |
|---|---|---|
| 109,359 | Australia | Dec. 21, 1939 |
| 1,037,391 | France | Apr. 29, 1953 |